United States Patent Office 3,713,864
Patented Jan. 30, 1973

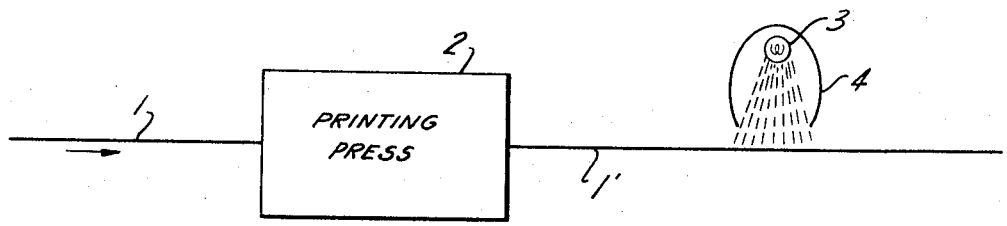

3,713,864
METHOD OF PRINTING OR COATING USING ACTINIC RADIATION SETTING OF APPLIED COATING AND COATED PRODUCT
Joseph Francis Ackerman, Cedar Grove, George Beerli, Arlington, Robert George Savageau, Pompton Lakes, and Joseph Weisfeld, Fair Lawn, N.J., assignors to Inmont Corporation, New York, N.Y.
Original application Jan. 6, 1971, Ser. No. 104,343, now Patent No. 3,673,140. Divided and this application Apr. 14, 1972, Ser. No. 244,219
Int. Cl. B44d 1/50
U.S. Cl. 117—38
8 Claims

ABSTRACT OF THE DISCLOSURE

Printing ink compositions preferably comprising epoxidized soybean oil acrylate or certain derivatives thereof and a radiation sensitizer having a triplet energy between about 42 and 85 kcal./mole. Also, the method of printing with such inks comprising exposing the inks to an amount of actinic radiation effective to polymerize the inks to a non-offsetting state and the printed substrate produced by this method.

Novel alkyd-derived compositions used as vehicles for the above printing ink compositions and preferably comprising the reaction product of
(1) an alkyd formed from trimethylol propane, tall oil fatty acid, and adipic acid with
(2) the reaction product of toluene diisocyanate and the monoacrylic acid ester of ethylene glycol.
The method of coating with such compositions comprising exposing them, in combination with a radiation sensitizer, to an amount of radiation effective to polymerize them to a non-offsetting state.

This is a division of application Ser. No. 104,343 filed Jan. 6, 1971 now Pat. No. 3,673,140.

BACKGROUND OF THE INVENTION

Field of the invention

This application relates to the field of actinic radiation curing printing inks and also to the method of printing and the substrates produced using same.

The application also relates to certain printing ink vehicle compositions which are novel compositions of matter per se and to the method of printing or coating using same.

Description of the prior art

Actinic radiation curing printing inks and coatings are of course known in the art. They have not, however, found significant commercial acceptance because of the slowness with which they cure, because they are often difficult to formulate, because they often use exotic and expensive materials and because the printing produced therewith has not been of acceptable gloss, color strength and sharpness.

Actinic radiation curing printing inks are now becoming subjects of considerable interest due to the fact that methods of printing using such inks contribute virtually no air pollutants to the atmosphere. By contrast, conventional printing methods normally require the evaporation of large quantities of solvent into the atmosphere.

SUMMARY OF THE INVENTION

Applicants have now developed (1) certain printing ink compositions comprising novel combinations of certain vehicles and radiation sensitizers with conventional colorants, (2) certain novel methods of printing using these printing ink compositions in combination with actinic radiation, (3) novel printed substrates produced using these printing inks and methods.

In addition, applicants have developed (4) certain printing ink vehicles which are believed to be novel resin compositions per se, and
(5) certain coating methods using ultra-violet radiation curing for use in coating with said vehicles.

Applicants' novel inks and methods result in printed substrates which have acceptable gloss, sharpness and color strength. Applicants' printing methods are non-polluting, have sufficient speed to be commercially acceptable and furthermore are adaptable to conventional equipment. Applicants' printing ink compositions also utilize readily available and relatively inexpensive materials.

Another major advantage of applicants' process is that it is a relatively "cold" process. Because of the speed which can be employed with this process, there is little heating of the substrate. Thus, this process can be employed on heat sensitive substrates. Also, it does not deteriorate paper substrates as the high temperatures of conventional drying ovens tend to do.

Another advantage arising out of the speed of curing of these compositions is that, if desired, curing stations can be employed between the printing stations of a multicolor press. Thus, each color can be applied on a dry substrate, rather than on a wet previously printed ink as is conventional. Use of this technique of drying between stations results in an extremely sharp and distinct printed image; also, less attention need be paid to problems of tack and trapping than with conventional processes.

BRIEF DESCRIPTION OF THE DRAWINGS

The single figure of the drawing shows in schematic form the method of curing the printing ink compositions of this invention.

DESCRIPTION OF THE PREFERRED EMBODIMENT

The printing ink compositions of this invention comprise three basic components:

(1) a vehicle,
(2) a sensitizer, and
(3) a colorant.

The following five vehicles or mixtures thereof can be used in the printing inks of this invention:

(1) Epoxidized drying oil or semi-drying oil acrylates. This material is produced by acrylating epoxidized drying or semi-drying oils. Drying and semi-drying oils are conventional materials which are defined and described in Kirk-Othmer's Encyclopedia of Chemical Technology (Interscience Publishers, Inc.—1951) at vol. 5, p. 277 et seq. and vol. 6, p. 146 et seq. The texts of these references are incorporated herein by reference. Preferred drying oils are soybean oil and linseed oil, with the former being particularly suitable. Such oils are reacted in a conventional manner with materials such as peracetic acid or hydrogen peroxide to form the epoxidized oils. One such material, which is preferred and which is commercially available, is Union Carbide's Flexol Plasticizer EPO. This material is described on pp. 10 and 11 of the 1970 edition of Union Carbide's publication entitled "Chemicals and Plastics Physical Properties." This material has a formula molecular weight of about 1,000 and contains at least 7.0% oxirane oxygen. Other properties of this material are described on the referenced pages. This material, and the other similar epoxidized drying and semi-drying oils, can be acrylated, for example, by reacting it with acrylic acid at about 100° C. in the presence of a polymerization inhibitor such as phenothiazine. After a reaction time of 2–40 minutes, the product is cooled to ambient conditions to prevent further reaction.

The epoxidized soybean oil acrylate which results from use of this method has about 3–4 acrylate groups per mole of epoxidized soybean oil acrylate, preferably about 3.6.

(2) The reaction product of the above-described epoxidized drying or semi-drying oil acrylates with methyl isocyanate, so as to yield a product having about 3–4 methyl isocyanate groups per mole of product, preferably about 3.6. This reaction product is obtained by mixing the reactants with gentle warming (not over 150° F.).

(3) The reaction product of the above-described epoxidized drying or semi-drying oil acrylates with about 0.1 to 2%, preferably about 1.5% by weight, of toluene diisocyanate. The reaction conditions are the same as those for (2).

(4) An alkyd-derived material formed from the reaction product of (1) an alkyd with
(2) the reaction product of a hydroxyl-containing acrylate, methacrylate or allyl moiety with a diisocyanate.

The alkyd material (1) is formed by the reaction of:

(a) a dibasic acid and/or anhydride
(b) a diol, triol and/or tetrol
(c) a monobasic acid.

Suitable dibasic acids or anhydrides include adipic, phthalic, isophthalic, terephthalic, tetrahydrophthalic, maleic, succinic, dodecenylsuccinic, azaleic and itaconic acids and their anhydrides. Preferred dibasic acids or anhydrides are adipic, dodecenylsuccinic and azaleic, particularly adipic acid. Dimer acids such as Empol 1014, 1018, 1022 and 1024 are also suitable. These are products of Emery Industries, Inc.

The polyols which can be used are diols such as ethylene and diethylene glycol, polyethylene and polypropylene glycol, butane diols such as 1,3 and 1,4-butane diol, hexane diols such as 1,3 and 1,6-hexane diol, ethylene and propylene oxide, mono epoxy compounds such as glycidyl esters of fatty acids and mono glycerides. Triols which can be used are trimethylolpropane, trimethylolethane, glycerine and the polyethylene and polypropylene adducts of these triols. Preferred triols are trimethylolpropane, its polypropylene glycol adduct, and glycerine, particularly trimethylolpropane. Tetrols which can be used are pentaerythritol and its polyethylene and polypropylene adducts.

Monobasic acids which can be used are carboxylic acids having from 4 to 22 carbon atoms. Preferred carboxylic acids are tall oil fatty acid, benzoic acid, rosin and p-tert butyl benzoic acid, particularly tall oil fatty acid.

Examples of suitable diisocyanate materials are methylene diisocyanate, hydrogenated methylene bisphenylene diisocyanate and toluene diisocyanate, with toluene diisocyanate being preferred.

The acrylate, methacrylate or allyl moiety materials can be, for example, acrylic, methacrylic and allyl acid monoesters of diols, and particularly the acrylic acid ester of ethylene glycol.

(5) The reaction product of bisphenol A-epichlorohydrin epoxy resins with methacrylic or acrylic acid. An example of the former such material is Epocryl 12, a product of Shell Chemical Company. An example of the latter such material is Shell's epoxy acrylate CULR 266–24. This latter material has been found to be particularly preferred.

The printing ink compositions of this invention also contain an ultraviolet light sensitizer. Sensitizers which are useful with the above vehicles have been found to be those which have a triplet energy in the range between about 42 and 85 kcal./mole. Many materials which are within this range are disclosed in Table 5–13 on p. 132 of Molecular Photochemistry by N. J. Turro (W. A. Benjamin, Inc., 1967), which is incorporated herein by reference. Preferred sensitizers have been found to be acetophenone, benzophenone, Michler's ketone and mixtures thereof. Particularly preferred sensitizers have been found to be mixtures of Michler's ketone and benzophenone in proportions of 1 to 8, respectively by weight; also benzophenone alone. For other than lithographic printing the addition of methyl diethanol amine to these sensitizers has been found to be particularly useful. For lithographic printing it is water soluble and unsuitable. However, for these uses other ethanolamines which are only slightly soluble or insoluble in water can be used, for example dipropyl ethanolamine. As an example of use of methyl diethanolamine, 3 parts of it per each two parts benzophenone have been found to be useful.

The amount of sensitizer used in the compositions of this invention can range between ½ and 20% by weight, preferably 5 to 10%.

The sensitizers of this invention are normally added to the vehicle in one of two ways. Either the sensitizer is melted, poured into and mixed with the vehicle or the vehicle and powdered sensitizer are ground together on a conventional three-roll mill.

Conventional colorants are the third component of the novel printing ink compositions of this invention. Such a colorant can be any conventional colorant (which term includes both pigments and dyes) which does not adversely react with or unduly inhibit the curing of the ink compositions. Typical dyes which have been found to be useful are triphenylmethane derivatives such as methyl violet, rhodamine and auramine. Typical pigments which have been found to be useful are Lithol Rubine (red), Benzidene Yellow, Green Shade Phthalocyanine Blue, Iron Blue, carbon black (channel or furnace) and iron oxide (black).

The colorant can be added to the printing ink compositions of this invention in amounts between about 1 and 60% by weight of the total ink, preferably from 1 to 15%.

The balance of the printing ink, after the amounts of colorant and sensitizer have been determined, is vehicle and any minor amounts of additives or solvent which may be desired.

The printing inks of this invention can also contain conventional ink additives. Examples of such additives are additives used to promote slip and to enhance the film properties of the printed substrate. Examples of the former are low melting microcrystalline waxes such as Ultraflex White Wax, a product of Bareco Wax Company. Low melting polyethylene waxes also are suitable, as are silicones. Additives to enhance film properties serve to increase gloss, hardness, and rub and scratch resistance. Phenolic resins such as Durez 209 and 220 are suitable. These are products of Hooker Chemical Corporation. Also suitable are Chlorowaxes, products of Diamond Shamrock Chemical Company.

Although the addition of solvents to the inks is normally not desirable because of pollution problems, it may sometimes be desired to add small amounts of conventional ink solvents up to 5% by weight, based on the total ink weight, to vary the viscosity of the ink. Examples of suitable solvents are alcohols, such as isopropanol and tridecyl alcohol, and high boiling (400–500° F.) hydrocarbons.

Other additives which can be used with this invention, in addition to those mentioned above, are reactive solvents such as trimethylolpropane triacrylate, pentaerythitol tetraacrylate and neopentyl glycol diacrylate. Such reactive solvents may be used to vary the viscosity of the product printing inks. They differ from conventional solvents in that, rather than being evaporated into the atmosphere during drying of the ink, they react and polymerize with the printing ink system when the system is subjected to actinic radiation. Thus, they contribute virtually no atmospheric pollutants.

The method of curing the printing ink compositions of this invention will be more readily understood by reference to the single figure of the drawing. In that figure reference numeral 1 represents a substrate which is being moved, by conventional means such as rollers (not shown), in the direction indicated by the arrow. The substrate moves through printing press 2, which is shown schematically by a block. The printed substrate 1' emerges from printing press 2 and passes beneath an ultraviolet light source 3 such as a mercury vapor lamp. The rays from the lamp 3 are directed against the printed substrate 1' by a reflector 4 which is preferably semi-elliptical in configuration. Lamp 3 is preferably positioned at about one focus of the ellipse and the moving printed substrate is positioned at about the other focus of the ellipse in order to most effectively utilize the energy of the system.

The amount of actinic radiation which is used with the method of this invention is an amount effective to polymerize the ink to a non-offsetting state. Such an effective amount will be readily determinable by those skilled in the printing arts and will vary with the type of pigment used. For example, since black pigment absorbs actinic radiation more readily than any other pigment, black ink made according to this invention will require a higher amount of actinic radiation to be effective to polymerize it to a non-offsetting state.

The term "non-offsetting" is a term which will be familiar to those skilled in the printing arts. It means that the ink on one sheet does not readily transfer to an adjacent sheet when the two sheets touch together, are stacked one on the other or rolled up or when one is slid over the other.

As pointed out above, the amount of actinic radiation which is effective to achieve a non-offsetting condition will vary with the characteristics of the ink used. However, as a guide, applicants have found that, for the ultraviolet range between 230 and 410 millimicrons, an energy striking the ink bearing substrate of at least about 0.05 joule per square centimeter for red ink and at least about 0.1 joule per square centimeter for black ink is necessary to achieve a non-offsetting state. Other, different colored inks would, of course, require minimum energies between these two extremes.

These minimum energy determinations were made using wedge printing plates (i.e. substrates bearing an ink band of varying thickness) of the type familiar to those skilled in the art. Such plates and their method of preparation are described in "Wedge Printing Plates" by J. M. Fetsko, Bulletin 54, National Printing Ink Research Institute (NPIRI), March 1960. Another such description appears in "Routine Control Printing With Wedge Plates" by Fetsko, Schaeffer and Zettlemayer, American Ink Maker, May 1962. Achievement of a non-offsetting state anywhere in a 0.1 to 0.5 mil ink thickness range of the wedge plate was considered to be acceptable.

The determination of the minimum energies necessary to achieve a non-offsetting ink state was made by using a 450 watt Hanovia mercury arc lamp #679 with a semi-elliptical reflector. The substrate bearing the ink to be cured was moved through the U.V. light at about the focus of the semi-elliptical reflector.

Minimum exposure times were determined by exposing wedge plates to the light for various time periods to determine the minimum exposure time necessary to achieve a non-offsetting ink state.

The power from the lamp was measured by placing an International Light IL 201 U.V. Visible Threshold Photometer at the focus of the semi-ellipse and measuring the power in the above frequency range by the use of a filter.

The above minimum energy figures correspond, for example, to exposing the substrate to a power, over the above frequency range, of 0.1 watt/cm.$^2$ for an exposure period of from about 0.5 second for a red ink and 1 second for a black ink.

The usual source of actinic radiation which applicants have employed is a medium-pressure mercury vapor lamp. Such lamps are available from Hanovia Lamp Division of Engelhard Hanovia, Inc., Newark, N.J. and are more particularly described in the examples.

Applicants have found it to be useful to employ a semi-elliptical reflector with the above-described mercury vapor lamps. By a semi-elliptical reflector, applicants mean a reflector which is about half an ellipse. The lamp is positioned at about one focus of the ellipse and the moving substrate is passed through at about the point where the other focus of the ellipse would lie. Such an arrangement is used to minimize as much as possible loss of actinic radiation to the surrounding area, and thus tends to increase the efficiency of the system.

The following examples will illustrate the manner of preparation and use of the vehicles and inks of this invention. The epoxidized soybean oil acrylate referred to in the examples is acrylated Flexol Plasticizer EPO (see col. 2) having about 3.6 acrylate groups per mole of product. Unless otherwise specified, the thickness of the layer of sensitized vehicle exposed was 0.1 to 0.5 mil as produced by the wedge plate technique.

EXAMPLE 1

An alkyd-derived vehicle was prepared as follows:

(A) One mole each of toluene diisocyanate and the acrylic acid ester of ethylene glycol (hereafter referred to as HEA) were reacted in a flask under an oxygen blanket at a temperature in the range between 40°–60° C. The reaction was allowed to proceed until a constant isocyanate value of about 14.5% was reached. The resulting product had a viscosity of X–Y and a Gardner color of 1–2.

(B) One mole of trimethylol propane and 0.4 mole of tall oil fatty acid were reacted in a flask at about 220° C. The water of esterification was removed by azeotroping until a hydroxyl functionality of 2.6 or less and an acid number of about nine were reached. 0.7 mole of adipic acid was then added at a temperature of about 230° C. The resulting material had a viscosity of $Z_5$ at 25° C. and a Gardner color of 2 to 3.

(C) A flask provided with an oxygen blanket and heated to about 50° C. was charged with 66 parts of B, 0.02 part of dibutyl tin dilaurate catalyst were then added to the flask, followed by 32.5 parts of A, which were added slowly over a period of about an hour until a constant diisocyanate value (or zero) was obtained. Finally, 1.5 parts of normal propanol were added to cap any remaining free diisocyanate.

EXAMPLE 2

(A) Toluene diisocyanate and HEA were reacted in the same manner as in Example 1.

(B) One mole of PEP–550 and 3 moles of tall oil fatty acid were esterified by reacting them at 200–230° C. until an acid number of 10 or less was obtained.

(C) One mole of B was charged to a flask having an oxygen blanket. Dibutyl tin dilaurate catalyst was added at the level of 0.01% by weight of the total charge, followed by the addition of one mole of A, which was added slowly over about an hour. The flask was maintained at about 50° C. The reaction was allowed to continue until a constant (or zero) isocyanate value was obtained. Finally, normal propanol was added as needed to cap any remaining free isocyanate.

PEP–550 is the propylene oxide adduct of pentaerythritol. It has a molecular weight of about 500 and is tetrafunctional in hydroxyl groups. It is a product of Wyandotte Chemicals Corporation, Wyandotte, Mich.

EXAMPLE 3

Example 2 was repeated but using 1 mole of PEP-550 to 2 moles of tall oil fatty acid in B. Subsequently, 1 mole of B was reacted with 2 moles of A. The resulting product had a viscosity of Z+.

EXAMPLE 4

A printing ink was made from the following components:

| Material: | Parts |
|---|---|
| Lithol rubine pigment | 0.155 |
| Epoxidized soybean oil acrylate | 0.400 |
| Ultraflex wax | 0.045 |
| | 0.600 |

These three materials were mixed and then ground on a three-roll mill until an acceptable grind was achieved. Subsequently, 0.3 additional part of epoxidized soybean oil acrylate was added during milling. An 8 to 1 sensitizer mixture was prepared from benzophenone and Michler's ketone, respectively. 0.1 part of the sensitizer was mixed with 0.9 part of the other materials by first melting the sensitizer and then adding it to the remaining materials while stirring.

The resulting ink was tested for its roll-out properties by rolling a standard amount of it on a glass plate and then transferring ink from the glass plate to a paper stock by using a hand-held hard rubber roller. A Quickpeek color proofing kit from Thwing-Albert Company of Philadelphia was used per the directions enclosed with it. The evenness of the roll-out was excellent. A conventional wedge plate was also prepared using a NPIRI-B Wedge Plate.

Laboratory

The above wedge plate was prepared on a piece of 43-pound International Paper publication stock. The coated stock was exposed for 3/8 of a second to a beam of light from a No. 679 Hanovia mercury vapor lamp with a semi-elliptical reflector. The paper was exposed at about 3.82 inches from the bottom of the bulb, and the width of the reflector at its base was about 6¼ inches. A complete cure of the ink was obtained.

Pilot

The ink was tested in pilot operation on a web-fed four-color Webendorfer web offset press, Serial No. W-262. The press was a 4 color press with 4 units in line. It had an 18" web width. The press used was fitted with three L 5142.430 Hanovia mercury vapor lamps, each 25 inches long and 5,000 watts. Corresponding Hanovia irradiators, power packs and control stations were used. The lamps were mounted side by side after the fourth press station, and the dryer on the press was not used. A 43-pound machine coated publication stock substrate was printed on this press with the ink of this example at 1,000 feet per minute. After printing, the web ran beneath the lamps at a distance of 2⅜ inches from the bottom of the reflector. Complete cure to a non-offsetting state was obtained at this speed. The resulting printed substrate exhibited excellent gloss and color strength.

EXAMPLE 5

The ink of Example 4 was prepared using 5% sensitizer rather than the 10% of Example 4. After exposure to ultraviolet light in the manner described in the Laboratory section of Example 4, a non-offsetting cure was obtained after ½ second exposure and a complete cure was obtained after 0.7 second exposure. Again, color strength and gloss were excellent.

EXAMPLE 6

The preferred reaction product of epoxidized soybean oil acrylate with methyl isocyanate (see col. 3, section 2) was tested for vehicle curing properties by the Laboratory procedure described in Example 4. 10% of the sensitizer of Example 4 was used. Non-offsetting cure was obtained at 0.4 second; complete cure was obtained at ½ to 1 second exposure.

EXAMPLE 7

The reaction product of epoxidized soybean oil acrylate with 1.5% toluene diisocyanate was tested for vehicle cure properties. The sensitizer used was 5% by weight of a mixture of 8 parts benzophenone, one part Michler's ketone and 12 parts methyl diethanolamine. A layer of the sensitizer-containing vehicle was exposed at a distance of 1½ inches from a No. 679 Hanovia mercury vapor bulb with a parabolic reflector. Complete cure was obtained at 0.4 second. 15% of carbon black (channel) was added to the sensitized vehicle to form an ink. The ink was exposed to light from the same lamp and non-offsetting cure was obtained at 5-8 seconds exposure.

EXAMPLE 8

Two parts of the vehicle of Example 1 were mixed with 5 parts of epoxidized soybean oil acrylate. The resulting mixture was then mixed with 5% of the sensitizer of Example 4. The resulting vehicle was tested for curing properties in the manner described in the Laboratory section of Example 4. Non-offsetting cure was obtained at 0.5 second and complete cure at 0.6 second.

EXAMPLE 9

The vehicle of Example 2 was tested for curing properties. It was mixed with 5% of the sensitizer of Example 4. The resulting material was exposed to ultraviolet light in the manner disclosed in the laboratory section of Example 4. Non-offsetting cure was obtained at 5 seconds and complete cure at 15 seconds exposure.

EXAMPLE 10

One part of the vehicle of Example 3 was mixed with one part of epoxidized soybean oil acrylate. The resulting mixture was mixed with 5% of the sensitizer of Example 4. Complete cure was obtained at 2.5 seconds exposure using the technique described is the Laboratory section of Example 4. Good gloss was obtained.

EXAMPLE 11

Four parts of Epocryl 12 were mixed with one part of epoxidized soybean oil acrylate. The mixture was mixed with 5% of the sensitizer described in Example 7. The resulting material was exposed in the manner described in Example 7. Complete cure was obtained at 0.8-1.2 seconds.

The above sensitized vehicle was pigmented with 15% carbon black (channel) and again exposed. Non-offsetting cure was obtained in 2 seconds.

EXAMPLE 12

A mixture of 15% lithol rubine, 4.5% Ultraflex wax and 80.5% epoxidized soybean oil acrylate was prepared. 95 parts of this mixture were mixed with 5 parts of each of the following sensitizers. The ink made with each of the five sensitizers was then exposed to ultraviolet light in the manner described in the Laboratory section of Example 4. The table below lists the sensitizers, their triplet energies and the number of seconds required to completely cure the ink.

TABLE

| Sensitizer | Triplet energy (kcal./mole) | Time for complete cure (seconds) |
|---|---|---|
| Benzil | 54 | 2.5 |
| Anthracene | 42 | 7 |
| Eosin | 43 | 8 |
| Phenol | 82 | 13 |
| Benzene | 85 | 10 |

EXAMPLE 13

A blue ink was prepared by mixing together and milling the following components in a conventional manner:

| Component: | Parts |
|---|---|
| CULR 266-24 (see col. 3 for description) | 55.3 |
| Phthalocyanine blue pigment | 9.6 |
| Ultraflex microcrystalline wax | 3.1 |
| Pentaerythritol tetraacrylate | 27.4 |
| Sensitizer of Example 4 | 4.6 |
| | 100.0 |

When a wedge plate made from this ink was exposed to U.V. light in the manner described in the Laboratory section of Example 4, complete cure was obtained at from 0.5 to 1.0 second.

The blue ink of this example, and red, yellow and black inks made by substituting red, yellow and black pigments for the blue pigment of this example, were tested in the manner set forth in the Pilot section of Example 4, except that four lamps were used instead of three. All four inks were printed on the substrate before exposure to U.V. light. Complete cure and excellent gloss and color strength were obtained at a speed of 1200 feet/minute, the maximum speed of the press.

Although some of the inks described in the above examples, for example those of Examples 7, 9 and 10-12, may cure too slowly for some commercial applications, they are also useful as viscosity and tack-varying additives for the other, faster curing inks.

In addition to use in printing inks, as described above, the vehicles herein described can also be applied, in a conventional manner, as clear protective layers over printed substrates.

We claim:

1. A method of coating comprising the steps of
   (A) coating a substrate with a layer of a composition of matter comprising
      (I) a liquid vehicle polymerizable to a solid upon exposure to actinic radiation, said vehicle comprising a major proportion of a resin which is the reaction product of
         (1) an alkyd or polyester having a hydroxyl equivalent weight from about 100 to 2500 and comprising the reaction product of
            (a) dibasic acid or anhydride or mixtures thereof,
            (b) a polyol selected from the group consisting of diols, triols and tetrols and mixtures thereof, and
            (c) monobasic acid, with
         (2) the reaction product of a diisocyanate with a hydroxyl-containing acrylate, methacrylate or allyl moiety,
      (II) an actinic radiation sensitizer for said vehicle,
   (B) exposing said layer to an amount of actinic radiation effective to polymerize said resin to a non-offsetting coating.

2. The method of printing comprising the steps of
   (A) printing on a substrate with a printing ink comprising
      (I) a liquid vehicle polymerizable to a solid upon exposure to actinic radiation, said vehicle comprising a major proportion of one or more resins selected from the group consisting of
         (a) the reaction product of an epoxidized drying or semi-drying oil and acrylic acid, having about 3 to 4 acrylate groups per mole of product
         (b) the reaction product of (a) with methyl isocyanate, wherein the product has about 3 to 4 methyl isocyanate groups per mole of product,
         (c) the reaction product of (a) with about 0.1 to 2.0% by weight toluene diisocyanate
         (d) an alkyd derived from the reaction product of
            (1) an alkyd formed from trimethylol propane, tall oil fatty acid, and adipic acid with
            (2) the reaction product of toluene diisocyanate and the acrylic acid ester of ethylene glycol
         (e) the reaction product of a bisphenol A-epichlorohydrin epoxy resin with methacrylic or acrylic acid
      (II) an actinic radiation sensitizer for said vehicle,
      (III) a colorant.
   (B) exposing the printed substrate to an amount of actinic radiation effective to polymerize said resin and form a non-offsetting printed surface.

3. The method of claim 2 wherein the printed substrate is exposed by moving it through at least one beam of actinic radiation.

4. The method of claim 3 wherein the printed substrate is exposed to ultraviolet radiation energy in the range between at least about 0.05 joule/cm.$^2$ for red ink and at least about 0.1 joule/cm.$^2$ for black ink and to corresponding intermediate energies for other colors of ink.

5. The method of claim 4 wherein the beam of ultraviolet radiation is directed from about one focus of a semi-elliptical reflector and the printed substrate is moved through about the other focus of the ellipse.

6. A printed substrate comprising
   (A) a substrate
   (B) a non-offsetting printing on the substrate comprising the dried residue of a printing ink comprising
      (I) a liquid vehicle polymerizable to a solid upon exposure to actinic radiation, said vehicle comprising a major proportion of one or more resins selected from the group consisting of
         (a) the reaction product of epoxidized soybean oil and acrylic acid, having about 3 to 4 acrylate groups per mole
         (b) the reaction product of (a) with methyl isocyanate, wherein the product has about 3 to 4 methyl isocyanate groups per mole of product
         (c) the reaction product of (a) with about 0.1 to 2.0% by weight toluene diisocyanate
         (d) an alkyd derived from the reaction product of
            (1) an alkyd formed from trimethylol propane, tall oil fatty acid, and adipic acid with
            (2) the reaction product of toluene diisocyanate and the acrylic acid ester of ethylene glycol
         (e) the reaction product of a bisphenol A-epichlorohydrin epoxy resin with methacrylic or acrylic acid
      (II) an actinic radiation sensitizer for said vehicle, said sensitizer having a triplet energy in the range between about 42 and 85 and being selected from the group consisting of acetophenone, benzophenone, Michler's ketone, and mixtures thereof
      (III) a colorant.

7. A printed substrate comprising
   (A) a substrate
   (B) a non-offsetting printing on the substrate comprising the dried residue of a printing ink comprising
      (I) a liquid vehicle polymerizable to a solid upon exposure to actinic radiation, said vehicle comprising a major proportion of the reaction product of a bisphenol A-epichlorohydrin epoxy resin with methacrylic or acrylic acid (II) an actinic radiation sensitizer for said vehicle, said sensitizer having a triplet energy in the range between about 42 and 85 and being a mixture of benzophenone and Michler's ketone (III) a colorant.

8. A printed substrate comprising
(A) a substrate
(B) printing on the substrate
(C) a clear layer, overlying the substrate and printing, comprising the dried residue of a liquid vehicle polymerizable to a solid upon exposure to actinic radiation, said vehicle comprising an actinic radiation sensitizer and a major proportion of one or more resins selected from the group consisting of
  (a) the reaction product of an epoxidized drying or semi-drying oil and acrylic acid, having about 3 to 4 acrylate groups per mole of product
  (b) the reaction product of (a) with methyl isocyanate, wherein the product has about 3 to 4 methyl isocyanate groups per mole of product.
  (c) the reaction product of (a) with about 0.1 to 2.0% by weight toluene diisocyanate
  (d) an alkyd derived from the reaction product of
    (1) an alkyd formed from trimethylol propane, tall oil fatty acid, and adipic acid with
    (2) the reaction product of toluene diisocyanate and the acrylic acid ester of ethylene glycol,
  (e) the reaction product of a bisphenol A-epichlorohydrin epoxy resin with methacrylic or acrylic acid.

References Cited

UNITED STATES PATENTS 3,509,234  4/1970  Burlant et al. _____ 117—93.31
3,557,043  1/1971  Krauss et al. _____ 117—161 KP ALFRED L. LEAVITT, Primary Examiner J. H. NEWSOME, Assistant Examiner U.S. Cl. X.R.

117—76 P, 93.31, 161 K, 161 KP, 161 ZB, 167, DIG 7; 204—159.119; 260—22 TN, 23 EP